(12) United States Patent
Lee et al.

(10) Patent No.: US 8,120,605 B2
(45) Date of Patent: Feb. 21, 2012

(54) IMAGE APPARATUS FOR PROVIDING THREE-DIMENSIONAL (3D) PIP IMAGE AND IMAGE DISPLAY METHOD THEREOF

(75) Inventors: Ki-wan Lee, Hwaseong-si (KR); Yeong-seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 12/125,630

(22) Filed: May 22, 2008

(65) Prior Publication Data
US 2009/0141024 A1 Jun. 4, 2009

(30) Foreign Application Priority Data
Dec. 4, 2007 (KR) .................. 10-2007-0125106

(51) Int. Cl.
*G06T 15/00* (2011.01)
(52) U.S. Cl. ...................................... 345/419
(58) Field of Classification Search ............. 715/850, 715/849
See application file for complete search history.

(56) References Cited

U.S. PATENT DOCUMENTS

| | | | | |
|---|---|---|---|---|
| 5,724,492 | A * | 3/1998 | Matthews et al. | 345/419 |
| 6,421,067 | B1 * | 7/2002 | Kamen et al. | 715/719 |
| 6,674,484 | B1 * | 1/2004 | Boland et al. | 348/580 |
| 6,795,972 | B2 * | 9/2004 | Rovira | 725/40 |
| 6,819,344 | B2 * | 11/2004 | Robbins | 715/848 |
| 7,134,095 | B1 * | 11/2006 | Smith et al. | 715/860 |
| 7,216,305 | B1 * | 5/2007 | Jaeger | 715/849 |
| 7,685,619 | B1 * | 3/2010 | Herz | 725/52 |
| 7,814,436 | B2 * | 10/2010 | Schrag et al. | 715/851 |
| 7,917,868 | B2 * | 3/2011 | Ok et al. | 715/848 |
| 2002/0171686 | A1* | 11/2002 | Kamen et al. | 345/850 |
| 2007/0011617 | A1* | 1/2007 | Akagawa et al. | 715/738 |
| 2007/0199021 | A1* | 8/2007 | Kim et al. | 725/39 |
| 2009/0187862 | A1* | 7/2009 | DaCosta | 715/836 |

\* cited by examiner

*Primary Examiner* — Xiao M. Wu
*Assistant Examiner* — Edward Martello
(74) *Attorney, Agent, or Firm* — Sughrue Mion, PLLC

(57) ABSTRACT

An image apparatus which provides a three-dimensional (3D) picture-in-picture (PIP) image, and an image display method thereof are provided. The image apparatus includes a graphic processor which adds a graphic representation to a main image to be displayed on a display, and a controller which controls the graphic processor to add a 3D form to the main image. Therefore, it is possible to provide a user with a single PIP image in which various sub-images are graphically represented in 3D.

17 Claims, 7 Drawing Sheets

IMAGE APPARATUS FOR PROVIDING THREE-DIMENSIONAL (3D) PIP IMAGE AND IMAGE DISPLAY METHOD THEREOF

CROSS-REFERENCE TO RELATED APPLICATIONS

This application claims priority from Korean Patent Application No. 10-2007-0125106, filed on Dec. 4, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing an image apparatus and displaying images, and more particularly, to providing an image apparatus and displaying a plurality of images on a display in order to provide a user with the displayed images.

2. Description of the Related Art

Broadcast receiving apparatuses such as digital televisions (DTVs) are capable of simultaneously displaying a plurality of broadcasts on a single screen, and so have a function enabling users to view the plurality of broadcasts at the same time.

Such a function of broadcast receiving apparatuses refers to a picture-in-picture (PIP) function. FIG. 1 shows an image provided by a TV in a two-dimensional (2D) PIP mode. In FIG. 1, a main image 20 and a sub-image 30 are simultaneously displayed on a DTV 10 in the 2D PIP mode. Such a PIP function may satisfy users' demands to simultaneously view a plurality of images.

In this situation, a user may change the channel of the sub-image 30 using channel number buttons or channel up and down buttons. However, when the user changes the channel of the sub-image 30 using the channel number buttons, he may experience inconvenience in pressing the channel number buttons, and alternatively, when the user presses the channel up and down buttons to change the channel of the sub-image 30, channels may change sequentially.

Additionally, when a plurality of sub-images 30 are displayed on a single screen in order to simultaneously provide a large number of images to the user, the plurality of sub-images 30 may cover most of the main image 20.

Therefore, there is a need for methods to satisfy users' demands to view a plurality of sub-images 30 while still being able to view the main image 20, and to freely change channels for the sub-images 30.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an image apparatus and an image display method thereof to satisfy users' demands to view a plurality of sub-images while still being able to view a main image, and to be able also to easily change channels for the sub-images.

According to an aspect of the present invention, there is provided an image display method comprising representing one or more sub-images on one or more respective faces of a three-dimensional (3D) form; adding the 3D form on which the one or more sub-images are represented to a main image; and displaying the main image to which the 3D form is added on a display.

The one or more sub-images may be displayed in a picture-in-picture (PIP) form.

The representing may comprise representing a sub-image indicating information on the type of input image on a specific face of the 3D form.

The 3D form may be a cube.

The image display method may further comprise receiving a rotation command. The displaying may comprise rotating the 3D form and displaying the main image to which the rotated 3D form is added on the display, if the rotation command is received.

The sub-images may be displayed as still images during rotation of the 3D form, and may be displayed as moving images before and after rotation of the 3D form.

The one or more sub-images may comprise one of an image received from an external source and a previously stored image. The main image may comprise one of an image received from an external source and a previously stored image.

According to another aspect of the present invention, there is provided an image apparatus comprising a graphic processor which adds a graphic representation to a main image to be displayed on a display; and a controller which controls the graphic processor to represent one or more sub-images on one or more respective faces of a 3D form, and to add the 3D form on which the one or more sub-images are represented to the main image.

The one or more sub-images may be displayed in a PIP form.

The controller may cause a sub-image indicating information on the type of input image to be represented on a specific face of the 3D form.

The 3D form may be a cube.

The image apparatus may further comprise a user command receiver. If a rotation command is received by a user using the user command receiver, the controller may rotate the 3D form and control the graphic processor to add to the main image the 3D form on which other sub-images are exposed due to rotation.

The sub-images may be displayed as still images during rotation of the 3D form, and may be displayed as moving images before and after rotation of the 3D form.

The one or more sub-images may comprise one of an image received from an external source and a previously stored image. The main image may comprise one of an image received from an external source and a previously stored image.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
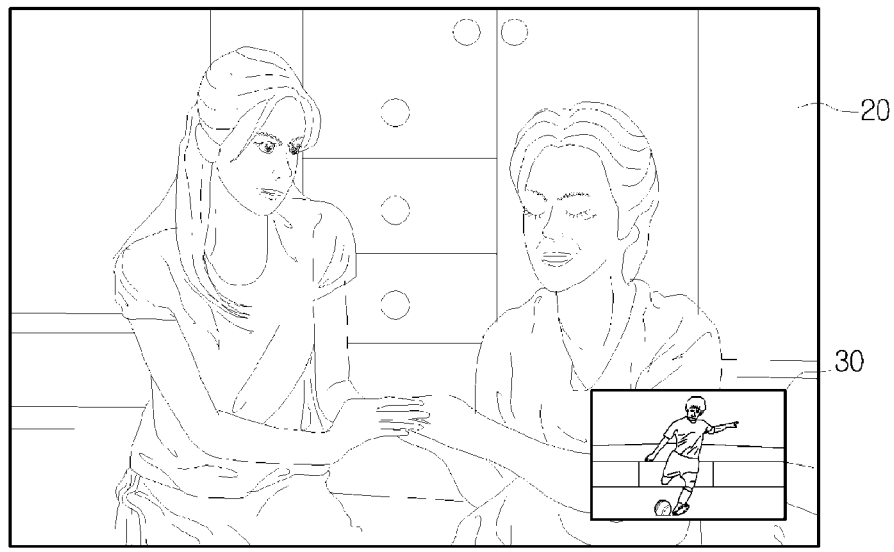
FIG. 1 is a view showing an image provided by a TV in a 2D PIP mode.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that exemplary embodiments of the present invention can be carried out without those specifically defined matters. Also, well-known functions or constructions are not described in excessive detail since they would obscure the invention unnecessarily.

Figure 2:
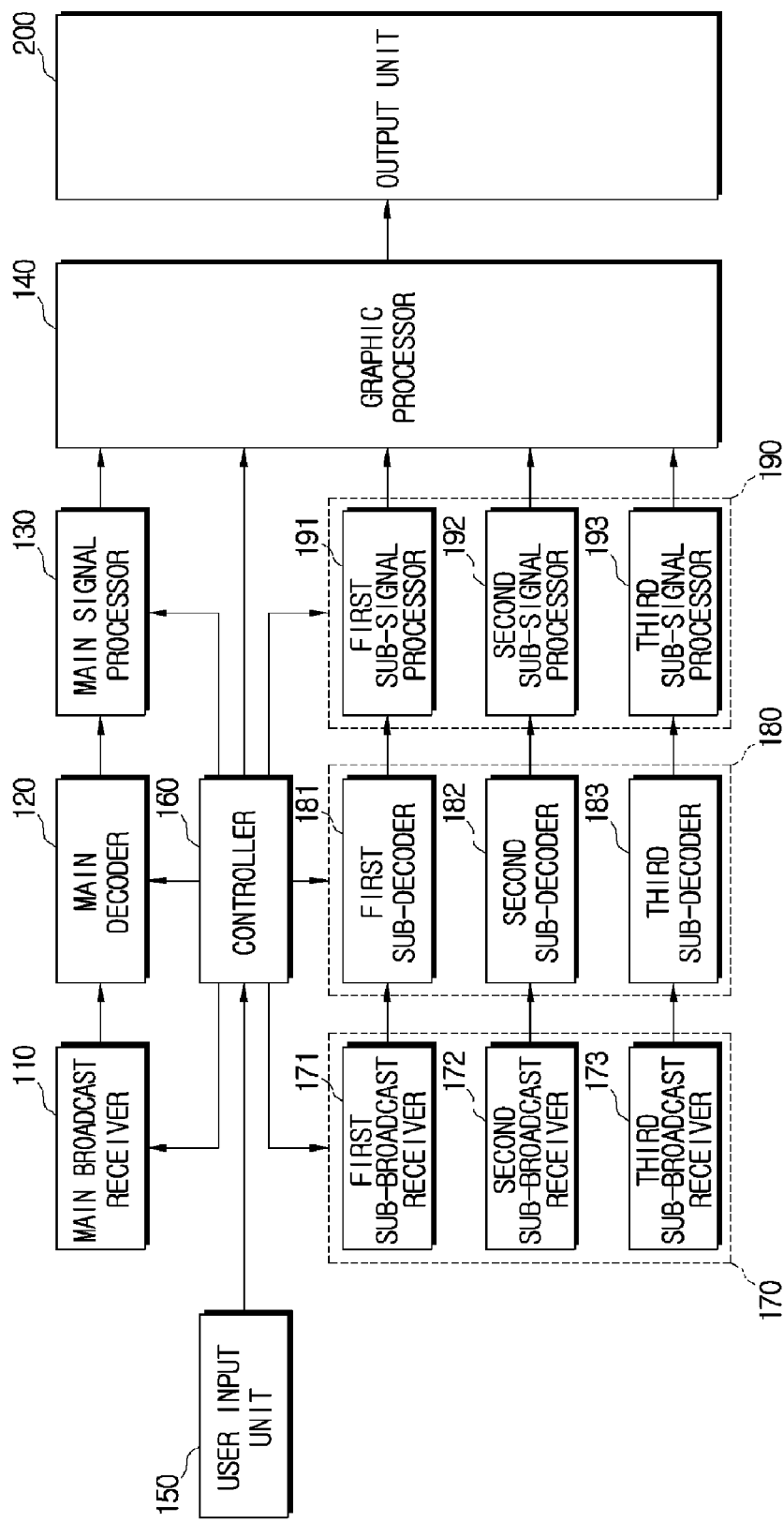
FIG. 2 is a block diagram of an image apparatus according to an exemplary embodiment of the present invention.

FIG. 2 is a block diagram of an image apparatus according to an exemplary embodiment of the present invention. The image apparatus according to the exemplary embodiment of the present invention may display a plurality of images provided by a plurality of broadcast channels on a single broadcast screen.

The plurality of images provided by the image apparatus and displayed on the single broadcast screen comprises a main image provided via a broadcast channel selected by a user and tuned, and a plurality of sub-images provided via broadcast channels previously set by the user and tuned.

The image apparatus of FIG. 2 comprises a main broadcast receiver 110, a main decoder 120, a main signal processor 130, a graphic processor 140, a user input unit 150, a controller 160, a sub-broadcast receiver 170, a sub-decoder 180, a sub-signal processor 190 and an output unit 200.

The main broadcast receiver 110 tunes to a broadcast channel selected by the user and receives an image provided by the tuned broadcast channel.

The main decoder 120 decodes the image output from the main broadcast receiver 110 and transfers the decoded image to the main signal processor 130.

The main signal processor 130 performs signal processing such as scaling with respect to the decoded image output from the main decoder 120, and then outputs the processed image to the graphic processor 140.

The sub-broadcast receiver 170 tunes to a broadcast channel and receives an image provided via the tuned broadcast channel in the same manner as the main broadcast receiver 110. However, the sub-broadcast receiver 170 may receive images provided via broadcast channels previously set by the user and sub-images which the user can view via a single PIP image, so the sub-broadcast receiver 170 differs from the main broadcast receiver 110.

For example, if the user selects channels 7, 9 and 11 and desires to view images provided by the selected channels in a PIP form, the sub-broadcast receiver 170 may tune to the three channels. To achieve this, the sub-broadcast receiver 170 comprises a first sub-broadcast receiver 171, a second sub-broadcast receiver 172 and a third sub-broadcast receiver 173.

The sub-decoder 180 decodes the image output from the sub-broadcast receiver 170 and transfers the decoded image to the sub-signal processor 190. The sub-decoder 180 comprises a first sub-decoder 181, a second sub-decoder 182 and a third sub-decoder 183 in order to decode images received from the first sub-broadcast receiver 171, second sub-broadcast receiver 172 and third sub-broadcast receiver 173, respectively.

The sub-signal processor 190 performs signal processing such as scaling with respect to the decoded images output from the sub-decoder 180. In more detail, the sub-signal processor 190 may scale the decoded images so that each of the decoded images may fit onto a face of a 3D form generated by the graphic processor 140.

For example, if the 3D form generated by the graphic processor 140 is a cube, each of the images scaled by the sub-signal processor 190 may have the same size, but if not, the images scaled by the sub-signal processor 190 may differ in size.

The sub-signal processor 190 comprises a first sub-signal processor 191, a second sub-signal processor 192 and a third sub-signal processor 193 in order to perform signal processing to the images respectively decoded by the first sub-decoder 181, second sub-decoder 182 and third sub-decoder 183. The images processed by the first sub-signal processor 191, second sub-signal processor 192 and third sub-signal processor 193 are transmitted to the graphic processor 140.

The graphic processor 140 generates a PIP image using, for example, a cube-like graphic representation (hereinafter, referred to as a cube). The cube may be stored in advance in a storage medium such as a memory built in the graphic processor 140. The graphic processor 140 may read the cube from the memory, and may map each of the broadcast images output from the sub-signal processor 190 onto a face of the read cube. Accordingly, the cube mapped with the sub-images may be used as a PIP image, so the user can view a 3D PIP image. Here, a 3D texture mapping technique may be used.

Additionally, the graphic processor 140 adds the cube mapped with the sub-images to the image output from the main signal processor 130, to generate a single broadcast screen.

The graphic processor 140 may map sub-images indicating information regarding the type of image stored in the memory to the cube, instead of the broadcast images received by the sub-broadcast receiver 170. For example, if a digital versatile disc (DVD) is connected to the image apparatus, the graphic processor 140 may map information that the DVD is connected to the image apparatus, information regarding the type of connected DVD or an image provided by the connected DVD as a sub-image, onto a face of the cube. Additionally, the graphic processor 140 may perform mapping when an image providing apparatus other than the DVD is connected to the image apparatus. Furthermore, the graphic processor 140 may map sub-images of images stored in the image apparatus to the cube, and may then provide the cube mapped with the sub-images in PIP form.

Moreover, the graphic processor 140 may rotate the cube mapped with the sub-images and provide the user with the rotated cube. In this situation, the sub-images mapped to the cube may be output as still images while the cube is being rotated. When the cube has finished rotating, the sub-images may be output as moving images.

If the cube mapped with the sub-images is rotated, sub-images of other channels previously set by the user may be mapped onto faces of the cube which are exposed by rotating the cube. In this situation, it is impossible for the user to view the sub-images that are displayed on faces of the cube which have become hidden due to rotation.

Hereinafter, operations of the graphic processor 140, which generates a single broadcast screen using the sub-images, main image and cube, will be described in detail with reference to FIG. 4.

Figure 4:
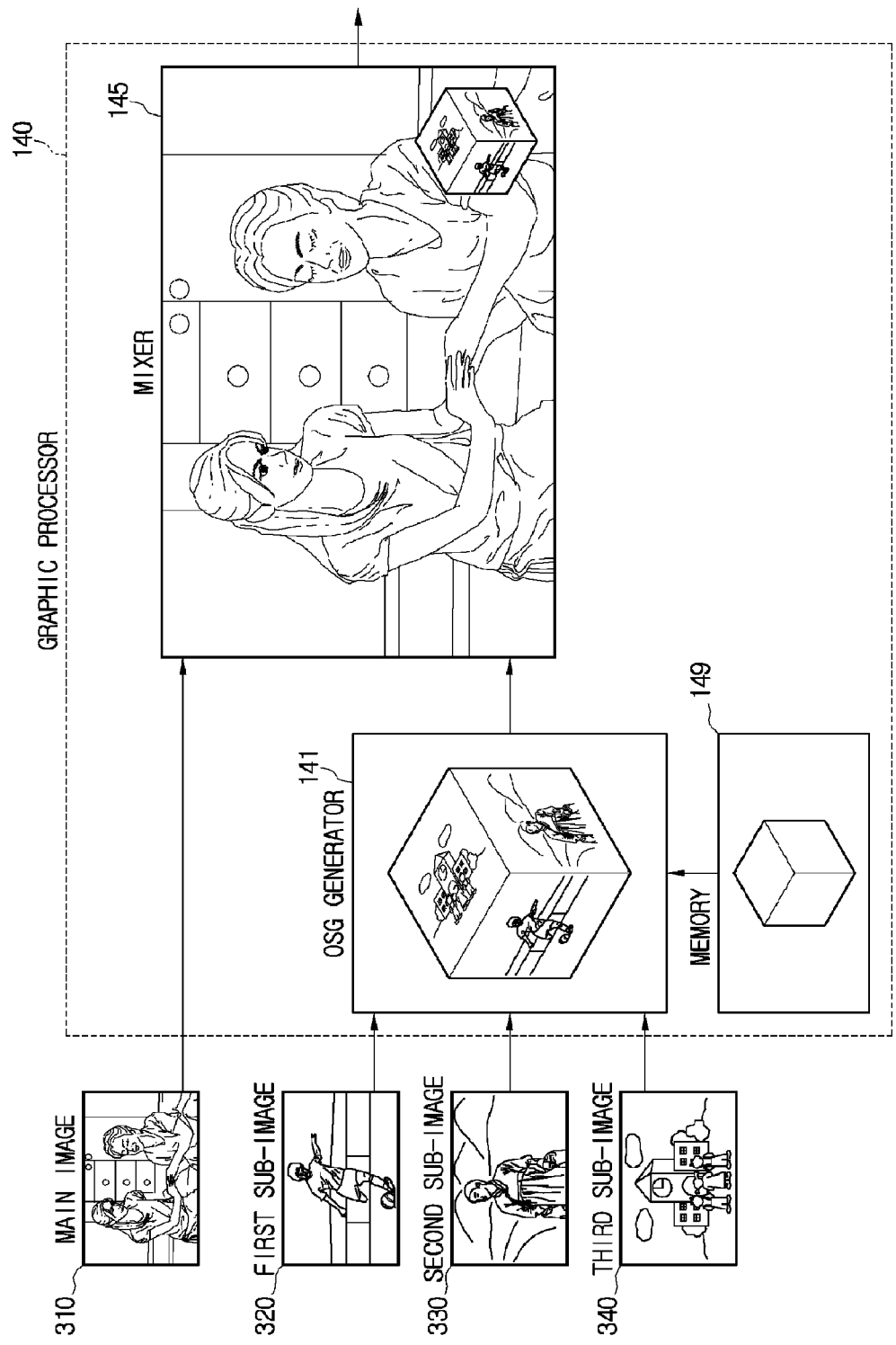
FIG. 4 is a diagram explaining in detail operations of a graphic processor 140 according to an exemplary embodiment of the present invention.

FIG. 4 is a diagram explaining in detail operations of the graphic processor 140 according to an exemplary embodiment of the present invention.

As described above, the graphic processor 140 combines the cube mapped with the sub-images with the image output from the main signal processor 130, to generate a single broadcast screen. The graphic processor 140 comprises an on-screen graphic (OSG) generator 141, a mixer 145 and a memory 149.

The memory 149 is a storage medium capable of storing data. The memory 149 stores a 3D form or sub-images indicating information regarding the types of images stored in the image apparatus.

The OSG generator 141 receives the 3D form and sub-images, and generates a graphic representation that will be set to be a PIP image. Specifically, the OSG generator 141 receives a first sub-image 320, second sub-image 330 and third sub-image 340 from the first sub-signal processor 191, second sub-signal processor 192 and third sub-signal processor 193, respectively. Additionally, the OSG generator 141 receives the 3D form stored in the memory 149.

The OSG generator 141 individually maps the received first sub-image 320, second sub-image 330 and third sub-image 340 onto respective faces of the 3D form.

Subsequently, the OSG generator 141 outputs a graphic representation of the 3D form mapped with the sub-images to the mixer 145.

The mixer 145 adds the graphic representation to a main image to generate an image which the user is able to view. In more detail, the mixer 145 receives a main image 310 from the main signal processor 130 and transmits the main image 310 to the output unit 200. If there is no need to graphically process the main image 310, the mixer 145 may only transfer the main image 310 from the main signal processor 130 to the output unit 200.

Alternatively, if a PIP command is input, the main image 310 may need to be graphically processed, so the mixer 145 may combine the graphic representation with the main image 310 received from the main signal processor 130 and transmit the combined image to the output unit 200. Specifically, the mixer 145 may add the graphic representation received from the OSG generator 141 to the main image 310 received from the main signal processor 130.

Accordingly, the mixer 145 may mix the main image 310 with the graphic representation mapped with the sub-images, and may then generate a composite image which the user is able to view. The mixer 145 may then transfer the generated composite image to the output unit 200.

Referring back to FIG. 2, the graphic processor 140 outputs a single broadcast image to the output unit 200.

The output unit 200 displays a single composite broadcast image output from the graphic processor 140 on a display device such as a liquid crystal display (LCD) or a plasma display panel (PDP).

The controller 160 controls the entire operation of the image apparatus, for example the broadcast receiving operation of the main broadcast receiver 110 and sub-broadcast receiver 170, the decoding operation of the main decoder 120 and sub-decoder 180, the scaling operation of the main signal processor 130 and sub-signal processor 190, and the image combining operation of the graphic processor 140.

In particular, the controller 160 controls the image apparatus to set a broadcast on a broadcast channel currently tuned by the main broadcast receiver 110 to be a main image and to set broadcasts on broadcast channels previously tuned by the sub-broadcast receiver 170 to be displayed in a 3D PIP form.

The user input unit 150 receives user commands regarding the operations of the image apparatus. Specifically, the user input unit 150 receives a user command to tune to a main image or tune to sub-images, or a user command to rotate a 3D PIP image. The user input unit 150 outputs the received commands to the controller 160.

Figure 3:
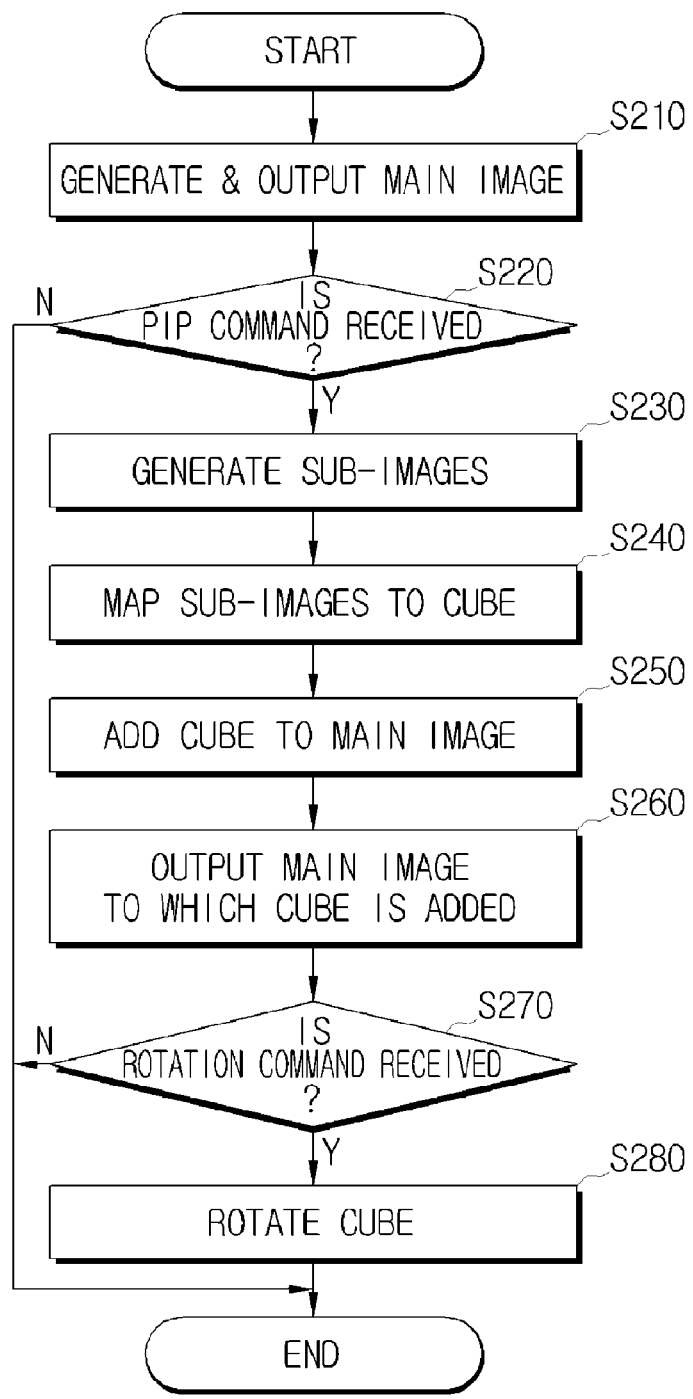
FIG. 3 is a flowchart explaining a process of adding a 3D form to a main image and rotating the 3D form to which the main image is added, according to an exemplary embodiment of the present invention.

FIG. 3 is a flowchart explaining a process of adding the 3D form to the main image and rotating the 3D form to which the main image is added, according to an exemplary embodiment of the present invention.

The main broadcast receiver 110, main decoder 120 and main signal processor 130 generate a main image and transmit the main image to the graphic processor 140. The graphic processor 140 then combines the graphic representation with the main image and transmits the combined image to the output unit 200, and the output unit 200 outputs the combined image in order to be viewed by the user (operation S210). The graphic representation may or may not include any images.

The controller 160 then determines whether the user inputs the PIP command using the user input unit 150 (operation S220).

If it is determined that the user inputs the PIP command (operation S220-Y), the controller 160 may control the sub-broadcast receiver 170, sub-decoder 180 and sub-signal processor 190 to generate three sub-images (operation S230).

The graphic processor 140 generates a cube onto which the three sub-images can be mapped, and maps each of the three sub-images onto respective faces of the generated cube (operation S240).

The graphic processor 140 adds the cube mapped with the three sub-images to the main image (operation S250).

The output unit 200 outputs the main image to which the cube is added, so that the user can view the output main image (operation S260).

The controller 160 then determines whether the user inputs a rotation command using the user input unit 150 (operation S270). Here, the rotation command refers to a user command to view sub-images other than the three sub-images generated according to the process described above.

If it is determined that the user inputs the rotation command (operation S270-Y), the controller 160 may rotate the cube and provide the user with images other than the three sub-images generated according to the process described above (operation S280). In more detail, the controller 160 may control the sub-broadcast receiver 170, sub-decoder 180 and sub-signal processor 190 to generate other sub-images and to map the generated sub-images onto faces of the cube other than the faces containing the three sub-images referred to above. Additionally, the controller 160 may add the cube mapped with the generated sub-images to the main image, and the output unit 200 may then output the main image to which the cube is added.

Therefore, the user may simultaneously view four images, including the main image and the three sub-images.

Figure 5A:
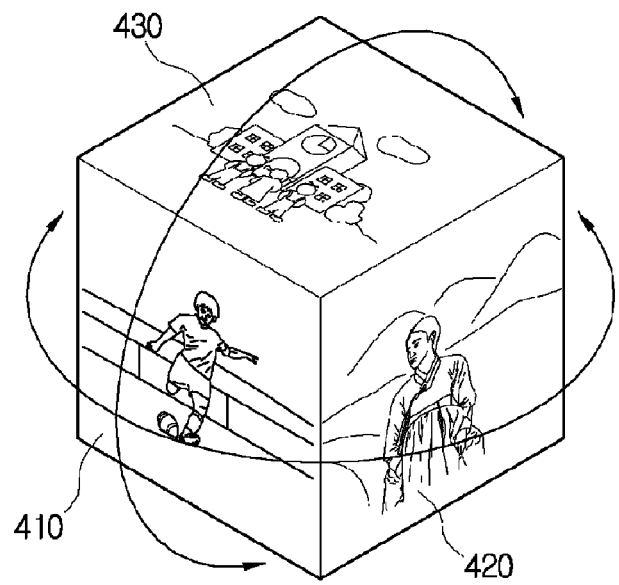
FIGS. 5A to 5C show 3D forms mapped with sub-images to be displayed in PIP form to explain a process of rotating the 3D form and showing various images.
Figure 5B:
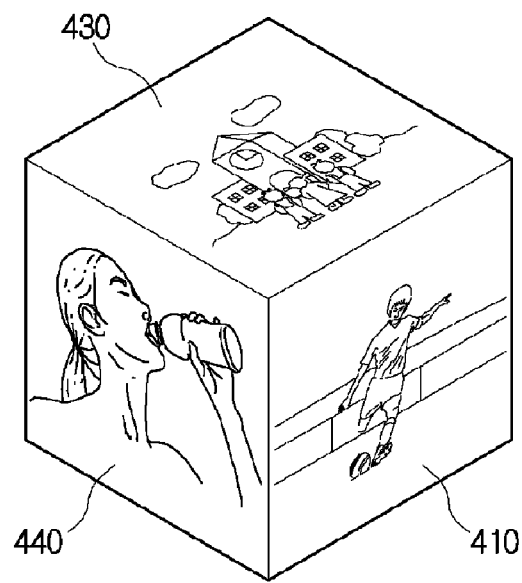
Figure 5C:
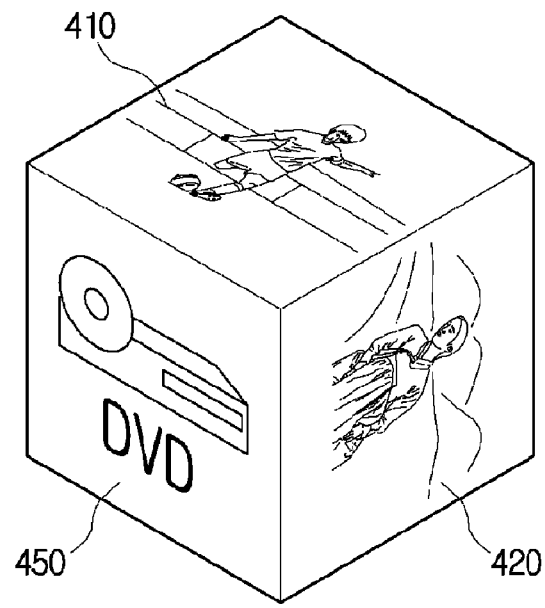

FIGS. 5A to 5C show 3D forms mapped with sub-images to be displayed in PIP form, in order to explain a process of rotating the 3D form and showing various images.

A first sub-image 410, second sub-image 420 and third sub-image 430 are mapped onto the front, right and top faces, respectively, of a cube shown in FIG. 5A. Here, the cube of FIG. 5A may be displayed as a PIP image, so the user can simultaneously view the main image and three sub-images.

FIG. 5B shows a PIP image displayed when the cube of FIG. 5A is rotated approximately 90° to the right. If the cube of FIG. 5A is rotated approximately 90° to the right, the third sub-image 430 may remain on the top face of the cube, but the first sub-image 410 that was previously displayed on the front face of the cube may be displayed on the right face of the cube.

In this situation, the second sub-image 420 that was previously displayed on the right face of the cube may be displayed on the rear face of the cube, so it is impossible for the user to view the second sub-image 420 as a PIP image.

Additionally, a fourth sub-image 440, which is placed on the left face of the cube and so does not appear, may be displayed on the front face of the cube. Thus, the fourth sub-image 440 may be displayed as a PIP image.

Accordingly, the fourth sub-image 440, first sub-image 410 and third sub-image 430, which are placed on the front, right and top faces of the cube, respectively, may be displayed as a PIP image and provided to the user, so the user can simultaneously view the main image together with the three sub-images.

The user may thus rotate the cube in PIP form right or left, so sub-images other than currently displayed sub-images may also be displayed.

FIG. 5C shows a PIP image displayed when the cube of FIG. 5A is rotated upwards approximately 90°. In this situation, the second sub-image 420 may remain on the right face of the cube, but the first sub-image 410 that was previously displayed on the front face of the cube may be displayed on the top face of the cube.

Additionally, the third sub-image 430 that was previously displayed on the top face of the cube may be displayed on the rear face of the cube, so it is impossible for the user to view the third sub-image 430 as a PIP image.

Furthermore, a DVD output image or an icon 450 indicating the DVD output image which is placed on the bottom face of the cube and so does not appear may be displayed as a PIP image on the front face of the cube.

As a result, the icon 450 which enables the user to view the DVD output image using a DVD player may be displayed on the front face of the cube of FIG. 5C, so it is possible to provide the user with the DVD output image. The second sub-image 420 and first sub-image 410 may appear on the right and top faces of the cube in PIP form, respectively, so the user may be provided with the two sub-images. The user may thus determine whether to view the DVD output image, while viewing the main image and the two sub-images.

Additionally, if the user again rotates the cube of FIG. 5C up and down, another image output from another image providing apparatus and an icon indicating the image may be output.

Accordingly, the user may rotate the cube in PIP form up or down, to view an image provided by an image providing apparatus other than the image providing apparatus from which images are currently provided.

Figure 6A:
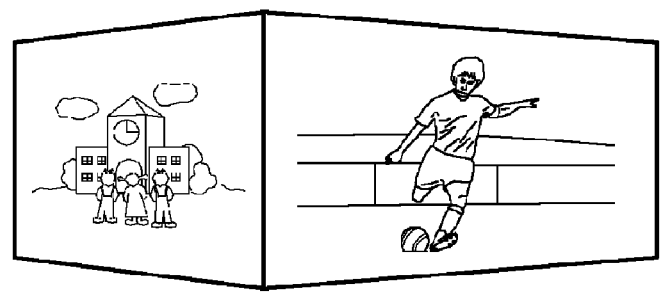
FIGS. 6A to 6C show 3D forms other than a cube to be displayed in PIP form.
Figure 6B:
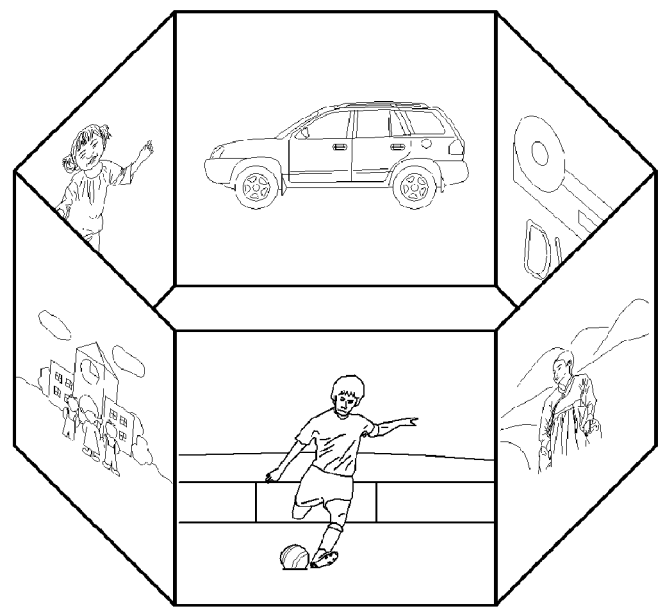
Figure 6C:
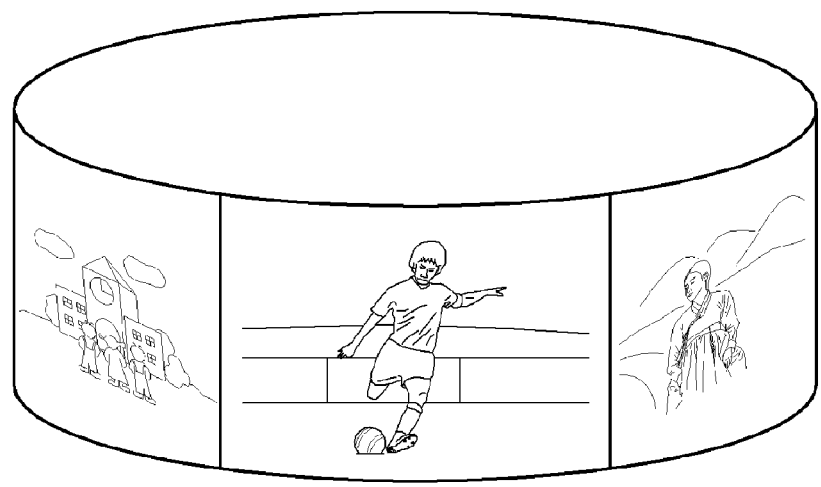

FIGS. 6A to 6C show 3D forms other than a cube, of which a varied number of faces are exposed, to be displayed in PIP form.

A 3D PIP image shown in FIG. 6A may be displayed in a different manner from the cube in PIP form shown in FIGS. 5A to 5C, so that two sub-images are shown. In this situation, the image apparatus may require two sub-broadcast receivers, two sub-decoders and two sub-signal processors.

FIG. 6B shows a 3D PIP image in a form other than a cube. The 3D PIP image of FIG. 6B has a hexahedral form without top and bottom faces, and thus sub-images may be represented on the rear face of the 3D form as a PIP image.

FIG. 6C shows a 3D PIP image in a cylindrical form, instead of a polygonal form. Since the 3D PIP image shown in FIG. 6C is in the form of a cylinder, there is only a single face, but various sub-images may be mapped onto the face and provided to the user.

Although the cube in PIP form is rotated right or left to display various sub-images, or is rotated up or down to display images provided by an image providing apparatus other than the image device according to the exemplary embodiment of the present invention, the present invention is also applicable to a situation in which sub-images are displayed even when the cube in PIP form is rotated up or down, or even when the cube in PIP form is rotated in any direction.

Additionally, in an exemplary embodiment of the present invention, if the cube in PIP form is rotated upwards approximately 90°, the DVD output image or the icon 450 indicating the DVD output image which is placed on the bottom face of the cube and so does not appear may be displayed on the front face of the cube. Furthermore, the second sub-image 420 and first sub-image 410 placed on the right and top faces of the cube, respectively, may be displayed as a PIP image and provided to the user. However, an image output from an image providing apparatus other than the DVD or an icon indicating the image may also be displayed on the right and top faces of the cube, respectively.

Moreover, the image apparatus according to an exemplary embodiment of the present invention comprises three sub-broadcast receivers, three sub-decoders and three sub-signal processors in order to simultaneously receive three sub-images, but the present invention is not limited thereto. Accordingly, the numbers of sub-broadcast receivers, sub-decoders and sub-signal processors in the image apparatus may be greater or less than three, in order to simultaneously receive more or less than three sub-images. Additionally, although the PIP image is in the form of a cube in an exemplary embodiment of the present invention, the PIP image may have various forms other than a polyhedral form.

Since the three sub-images are displayed on the cube in PIP form, the three sub-broadcast receivers, three sub-decoders and three sub-signal processors are required in an exemplary embodiment of the present invention. However, even when only three sub-images are displayed, the image apparatus may comprise three or more broadcast receivers, three or more sub-decoders and three or more sub-signal processors. In this situation, when the cube in PIP form is rotated, another sub-broadcast receiver, sub-decoder and sub-signal processor may generate a sub-image to be represented on the front face of the cube, instead of the sub-broadcast receiver, sub-decoder and sub-signal processor which have generated a sub-image to be displayed on the rear face of the cube.

Additionally, each sub-image mapped to the cube is a still image while the cube in PIP form is rotated in the exemplary embodiment of the present invention, but the present invention is also applicable to a situation in which each sub-image is a moving image when the cube is rotated.

Furthermore, although the cube is rotated approximately 90° up, down, left or right in the exemplary embodiment of the present invention, the cube may be rotated more or less than 90°. In this situation, the rotation of the cube may be paused when images other than images shown prior to rotation are displayed.

Moreover, the cube is added to the main image in PIP form and the combined image is displayed on the output unit in the exemplary embodiment of the present invention, but it is also possible for only the cube mapped with sub-images to be displayed on the output unit while the main image is not displayed.

Additionally, the user selects a desired sub-image to view the selected sub-image in the maximum size while rotating the cube in an exemplary embodiment of the present invention, but it is also possible for only the desired sub-image to be displayed as a PIP image, and other sub-images may disappear. Furthermore, the desired sub-image may be set to be a main image, and the main image may be set to be a sub-image.

As described above, according to an exemplary embodiment of the present invention, a user may be provided with a variety of sub-images in a single 3D PIP form. Therefore, it is possible to satisfy users' demands to view a plurality of sub-images while still being able to view a main image, and to easily change channels for the sub-images.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An image display method comprising:
representing at least one sub-image on at least one face, respectively, of a three-dimensional (3D) form;
adding the 3D form on which the at least one sub-image is represented, to a main image; and
displaying the main image to which the 3D form is added, on a display,
wherein the at least one sub-image is displayed as a still image during rotation of the 3D form, and the at least one sub-image is displayed as a moving image before and after rotation of the 3D form.

2. The image display method as claimed in claim 1, wherein the at least one sub-image is displayed in a picture-in-picture (PIP) form.

3. The image display method as claimed in claim 1, wherein the representing comprises representing one of the sub-images, indicating information on a type of input image, on one of the faces of the 3D form.

4. The image display method as claimed in claim 1, wherein the 3D form comprises a cube.

5. The image display method as claimed in claim 1, further comprising receiving a rotation command,
wherein the displaying comprises rotating the 3D form and displaying the main image to which the rotated 3D form is added, on the display.

6. The image display method as claimed in claim 1, wherein the at least one sub-image comprises one of an image received from an external source and a previously stored image, and the main image comprises one of an image received from an external source and a previously stored image.

7. The method according to claim 1, wherein the 3D form does not include a top and does not include a bottom.

8. The image display method as claimed in claim 1, wherein the representing comprises representing the at least one sub-image on a rear side of the at least one face.

9. An image apparatus comprising:
a processor which adds a graphic representation to a main image to be displayed on a display; and
a controller which controls the processor to represent at least one sub-image on at least one face, respectively, of a three-dimensional (3D) form, to generate the graphic representation, and to add the 3D form on which the at least one sub-image is represented, to the main image,
wherein the at least one sub-image is displayed as a still image during rotation of the 3D form, and the at least one sub-image is displayed as a moving image before and after rotation of the 3D form.

10. The image apparatus as claimed in claim 9, wherein the at least one sub-image is displayed in a picture-in-picture (PIP) form.

11. The image apparatus as claimed in claim 9, wherein the controller controls one of the a sub-images indicating information on a type of input image, to be represented on one of the faces of the 3D form.

12. The image apparatus as claimed in claim 9, wherein the 3D form comprises a cube.

13. The image apparatus as claimed in claim 9, further comprising a user command receiver,
wherein the controller rotates the 3D form and controls the processor to add to the main image the 3D form on which other sub-images are exposed due to rotation, if a rotation command is received from a user using the user command receiver.

14. The image apparatus as claimed in claim 9, wherein the at least one sub-image comprises one of an image received from an external source and a previously stored image, and the main image comprises one of an image received from an external source and a previously stored image.

15. The image apparatus as claimed in claim 9, wherein the 3D form does not include a top and does not include a bottom.

16. The image apparatus as claimed in claim 9, wherein the controller represents the at least one sub-image on a rear side of the at least one face.

17. An image display method comprising:
representing at least one sub-image on at least one face, respectively, of a three-dimensional (3D) form;
adding the 3D form on which the at least one sub-image is represented, to a main image;
displaying the main image to which the 3D form is added, on a display; and
receiving a rotation command,
wherein the displaying comprises rotating the 3D form and displaying the main image to which the rotated 3D form is added, on the display,
wherein the at least one sub-image is displayed as a still image during rotation of the 3D form and the at least one sub-image is displayed as a moving image before and after rotation of the 3D form,
wherein the representing comprises representing the at least one sub-image on a rear side of the at least one face.

* * * * *